(12) United States Patent
Kim

(10) Patent No.: US 10,726,658 B1
(45) Date of Patent: Jul. 28, 2020

(54) SENSOR-ENABLED VENDING MACHINE

(71) Applicant: Snap Inc., Santa Monica, CA (US)

(72) Inventor: Jinwoo Kim, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/809,729

(22) Filed: Nov. 10, 2017

Related U.S. Application Data

(60) Provisional application No. 62/420,554, filed on Nov. 10, 2016.

(51) Int. Cl.
*G07F 11/00* (2006.01)
*G07F 17/16* (2006.01)
*G07F 17/00* (2006.01)

(52) U.S. Cl.
CPC .............. *G07F 11/00* (2013.01); *G07F 17/16* (2013.01); *G07F 17/0014* (2013.01)

(58) Field of Classification Search
CPC .......... G07F 11/00; G07F 27/02; G07F 27/34; G07F 17/16; G07F 17/0014
USPC .................................................. 700/231–244
See application file for complete search history.

(56) References Cited

U.S. PATENT DOCUMENTS

| | | | |
|---|---|---|---|
| 6,957,125 B1 * | 10/2005 | Rifkin | G07F 17/26 221/3 |
| 8,473,864 B2 * | 6/2013 | Segal | G06F 3/0488 715/764 |
| 8,781,622 B2 * | 7/2014 | Mockus | G06Q 20/18 700/237 |
| 9,196,005 B2 * | 11/2015 | Williams | G06Q 30/0643 |
| 2010/0100236 A1 * | 4/2010 | Segal | G07F 9/02 700/232 |
| 2010/0103131 A1 * | 4/2010 | Segal | G07F 9/02 345/173 |
| 2011/0288680 A1 * | 11/2011 | Samain | A45D 44/005 700/239 |
| 2012/0029691 A1 * | 2/2012 | Mockus | G06Q 20/18 700/232 |
| 2014/0188271 A1 * | 7/2014 | Hernandez | B67D 1/0888 700/232 |
| 2016/0107820 A1 * | 4/2016 | MacVittie | A61J 7/0472 221/13 |

* cited by examiner

*Primary Examiner* — Michael Collins
(74) *Attorney, Agent, or Firm* — Schwegman Lundberg & Woessner, P.A.

(57) ABSTRACT

A button assembly, vending machine using such a button-assembly, and methods of use thereof are disclosed. In an example, the button assembly can include a base, and a button component resiliently coupled to the base, such that the button component is depressible relative to the base. The button component can define a cavity, and the assembly can also include a first sensor configured to sense proximity of a human user to the button assembly, the first sensor being disposed in the cavity of the button component.

10 Claims, 6 Drawing Sheets

SECTION A-A

SENSOR-ENABLED VENDING MACHINE

CROSS-REFERENCE TO RELATED APPLICATIONS

The present application claims the benefit of the filing date of U.S. Provisional Application No. 62/420,554, titled "Sensor-Enabled Vending Machine Button", the disclosure of which is hereby incorporated by reference herein in its entirety.

BACKGROUND

Machines provided in substantially stationary mode for public human interaction (such as vending machines, automated dispensing machines, parking ticket machines, and the like) sometimes have user interfaces that include sensors detecting human gestures and the like. Such sensors have often proven to be ineffective and/or unsightly.

BRIEF DESCRIPTION OF THE DRAWINGS

Various ones of the appended drawings illustrate merely example embodiments of the present disclosure and should not be considered as limiting its scope.

OVERVIEW

Figure 1:
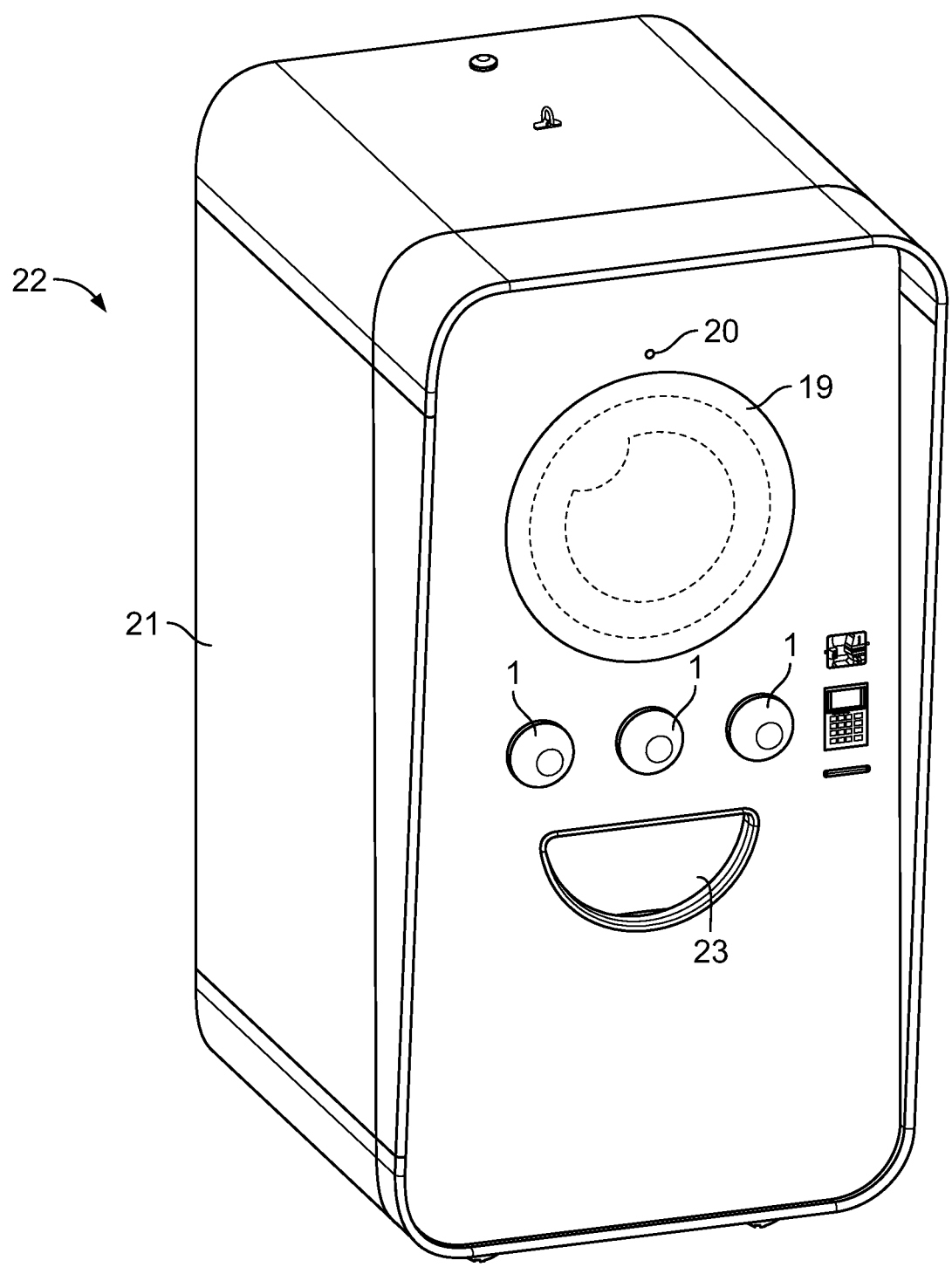
FIG. 1 is a schematic three-dimensional view of a vending machine according to one example embodiment

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

A button assembly for a substantially stationary dispensing machine, the button assembly including an integrated user detector to sense proximity of a human user to the button assembly.

In some embodiments, the user detector comprises a proximity and/or motion sensor forming part of the button assembly such that the sensor is hidden from view by a button component depressible by a user to indicate selection of the button assembly. The button component may be substantially dome-shaped, defining a concavity in which the sensor is at least partially located and/or which screens the sensor from view.

In some embodiments, the dome-shaped button component may be translucent, the button assembly including a backlighting arrangement to effect backlighting of the button component.

Another aspect of the disclosure provides for a vending machine that includes a button assembly as described.

Several more specific examples of the disclosure are provided below for illustrative purposes only.

Example 1 provides a button assembly comprising a base, a button component resiliently coupled to the base, such that the button component is depressible relative to the base, the button component defining a cavity, and a first sensor configured to sense proximity of a human user to the button assembly, the first sensor being disposed in the cavity of the button component.

Example 2 provides the button assembly of Example 1, wherein the first sensor comprises a proximity and/or motion sensor.

Example 3 provides the button assembly of Example 2, wherein the button component is composed of a translucent material that has a translucency sufficient to hide the first sensor from view, but allow light to pass through the button component.

Example 4 provides the button assembly of Example 3, further comprising a backlighting arrangement comprising one or more lights configured to provide backlighting for the button assembly.

Example 5 provides the button assembly of Example 1, further comprising a second sensor, the second sensor being configured to detect depression of the button component relative to the base.

Example 6 provides the button assembly of Example 5, wherein the second sensor is an optical sensor.

Example 7 provides the button assembly of Example 1, further comprising an interference member obscuring a portion of the first sensor, such that the first sensor is configured to sense only a portion of the human user.

Example 8 provides a vending machine comprising a vending-machine housing having a cavity configured to store one or more items, and a button assembly incorporated into the vending-machine housing. The button assembly comprises a base, a button component resiliently coupled to the base, such that the button component is depressible relative to the base, the button component defining a cavity, and a first sensor configured to sense proximity of a human user to the vending machine, the first sensor being disposed in the cavity of the button component.

Example 9 provides the vending machine of Example 8, further comprising a camera and a display integrated into the vending-machine housing.

Example 10 provides the vending machine of Example 9, further comprising a computing device configured to perform automated operations comprising processing images captured by the camera of a user of the vending machine, and displaying, on the display, an augmented image of the user utilizing at least one of the items stored in the vending machine.

Example 11 provides the vending machine of Example 10, wherein the one or more items comprise wearable items, and the computing device is further configured to perform automated operations comprising displaying, on the display, an augmented image of the user wearing at least one of the wearable items.

Example 12 provides the vending machine of Example 8, wherein the button component is composed of a translucent material that has a translucency sufficient to hide the first sensor from view, but allow light to pass through the button component.

Example 13 provides the vending machine of Example 8, wherein the first sensor is configured to detect proximity and/or motion of a human user relative to the vending-machine housing through the button component.

Example 14 provides the vending machine of Example 8, further comprising a second sensor, the second sensor being configured to detect depression of the button component relative to the base.

Example 15 provides the vending machine of Example 14, wherein the second sensor is an optical sensor.

Example 16 provides a method of operating a vending machine comprising providing a vending machine comprising a computing device, a display, and a button assembly, the button assembly including a button component, detecting proximity of a user relative to a housing of the vending machine using a first sensor incorporated in the button assembly, and by way of the computing device, causing the display of the vending machine to enter a user-interaction cycle when the sensor detects that a user is within a certain predefined proximity to the vending machine.

Example 17 provides the method of Example 16 further comprising registering a user selection during the user-interaction cycle, the user selection selecting an item stored inside the vending machine, capturing, using a camera associated with the vending machine, a first image of the user, and displaying, by way of the display, an augmented image of the user based on the first image that depicts the user utilizing the selected item.

Example 18 provides the method of Example 17, wherein the item is a wearable item, and the method further comprises displaying, by way of the display, an augmented image of the user based on the first image that depicts the user wearing the selected item.

Example 19 provides the method of Example 16, wherein the button assembly comprises a base, the button component being resiliently coupled to the base, such that the button component is depressible relative to the base, the button component defining a cavity that houses the first sensor.

Example 20 provides the method of Example 19, further comprising depressing the button component to select an item stored in the vending machine.

DESCRIPTION OF EXAMPLE EMBODIMENT

FIG. 1 shows an example embodiment of a vending machine 22 that includes three button assemblies that includes integrated user sensors in accordance with an example embodiment. In this example, the vending machine 22 dispenses electronics-enabled articles of eyewear, further referred to herein as smart glasses or spectacles.

The vending machine 22 has an elongated box-shaped (or parallelepipedal) body 21 having a hollow interior. The vending machine 22 provides a container in which multiple smart glasses of a plurality of different variants are securely stored. In this example embodiment, the vending machine 22 stores three different variants of a particular model of smart glasses (e.g., eyewear articles provided by Snap Inc. under the trade name Spectacles). Here, the three variants differ only in frame color, the smart gases being available in red, black, or green versions.

A separate selection button 1 is provided for each of the respective variants, with the three selection buttons 1 being accessible on a front panel of the vending machine 22 for selection by a user to trigger the dispensing of a corresponding variant of the smart glasses. As can be seen in FIG. 1, the three selection buttons 1 are in this example embodiment arranged in a substantially horizontally extending row that is vertically flanked by a circular display screen 19 and a semicircular dispensing mouth 23. It will be appreciated that the particular shape and spatial arrangement of these components may vary between different embodiments of a vending machine 22 or a dispensing machine consistent with the disclosure.

In some embodiments, the display screen 19 may be touch-enabled for receiving haptic user input, but in this example embodiment, the display screen 19 is configured for the display of video and pictorial content only, without serving as an input mechanism.

A user interface thus provided by the vending machine further includes a credit card reader and associated keypad mounted in the front panel of the vending machine 22 in line with the row of selection buttons 1.

The present invention further includes an integrated camera. A lens opening 20 for the camera is defined in the front panel immediately above the circular display screen 19. The camera is mounted and oriented to capture facial and upper-body imagery of a user when in a position to interact with the selection buttons 1.

The machine further includes one or more user detection sensors to sense proximity of a user to the vending machine front panel, to enable automatic activation of the vending machine 22 user interface when a user approaches the vending machine front panel sufficiently closely to initiate interaction therewith. In this example embodiment, the user detection sensor is housed within a button assembly providing one of the three selection buttons 1. Specifically, the user detection sensor is in this example embodiment integrated in the central one of the three selection buttons 1.

Interaction between the selection buttons 1, camera, display screen 19, dispensing mouth 23, and internal electronics of the vending machine 22 will be described later herein, subsequent to the following more detailed description of the construction and operation of the respective selection buttons 1.

Figure 2:
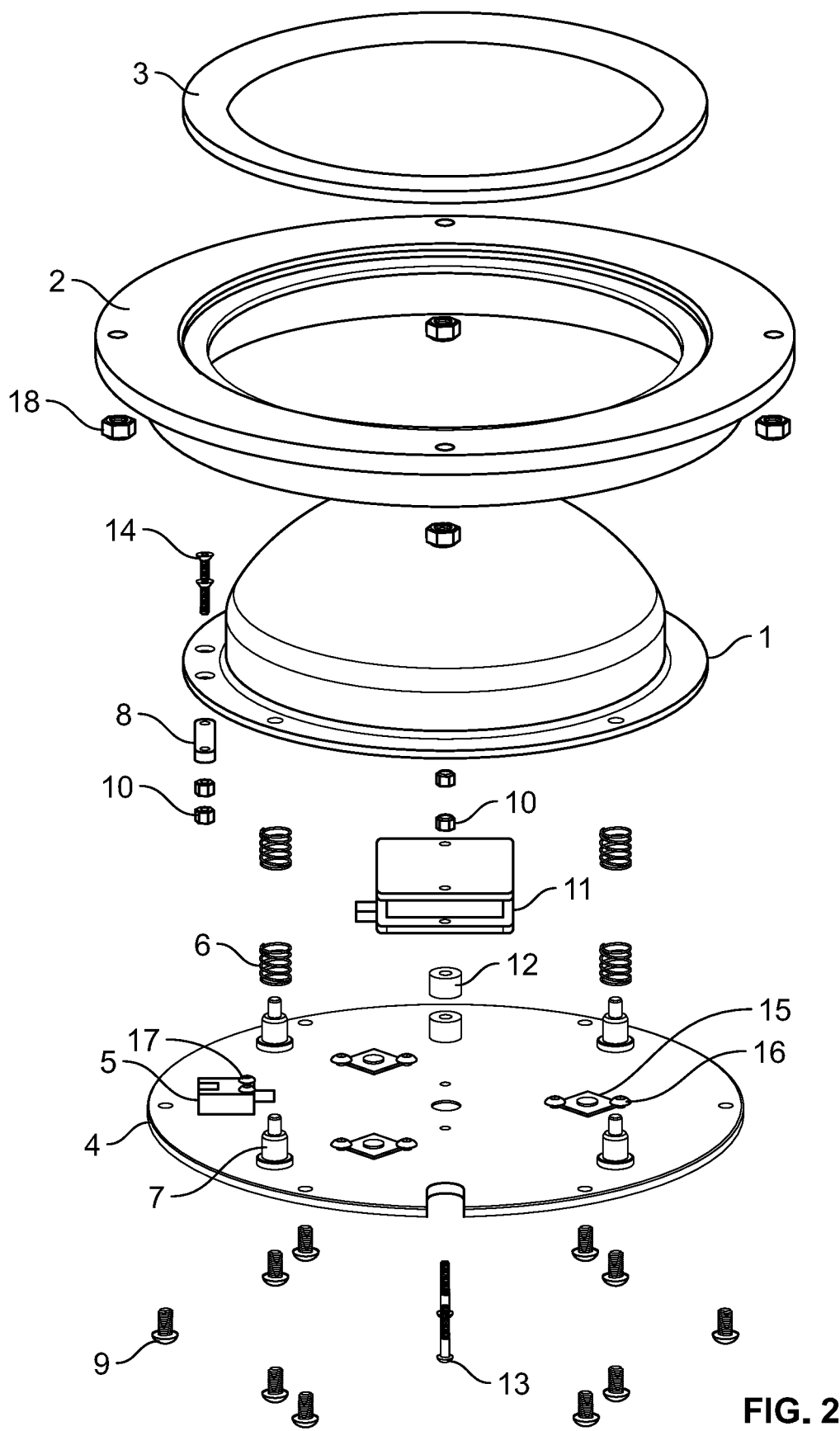
FIG. 2 is an exploded three-dimensional view of a button assembly forming part of a vending machine according to an example embodiment.

FIG. 2 shows an exploded view of a button assembly that provides the central selection button of the vending machine illustrated in FIG. 1. A number of the different components of the button assemblies are indicated in FIG. 2 by respective reference numerals.

The button assembly in this example embodiment includes a base plate 4 on which is mounted an array of lighting devices to provide backlighting for a translucent colored button-dome 1. Here, the array of lighting devices comprises three LEDs 15 (here, CITILED CLU 027-0303C1) arranged circumferentially in axial symmetry about a polar axis of the circular base plate 4. The LEDs 15 can be fixed to the base plate 4 using fixation mechanisms 16 (e.g., screws). Although not shown in FIG. 2, the LEDs are connected by respective power cables to a portable power source incorporated in the vending machine body.

The base plate 4 further carries four spigots or spring keepers 7 receivable in complementary locator holes in a rim or flange that extends circumferentially around an axially inner extremity of the button dome 1. Each spring keeper 7 holds captive between itself and the button rim a respective compression spring 6 that urges the button dome 1 axially outwards and into contact with a button housing 2 fastened to the front panel of the vending machine 22. The button housing 2 can be fastened to the front panel of the vending machine 22 using nuts 18 and corresponding fixation mechanisms (not shown) (e.g., screws). The button dome 1 thus rides on the four spring actuators, allowing axially inward movement of the dome 1 relative to the cover plate in the direction of the spring 6 at each of the spring actuators in response to a user pressing the button, and effecting automatic resilient return of the button to its default position upon release.

Figure 3:
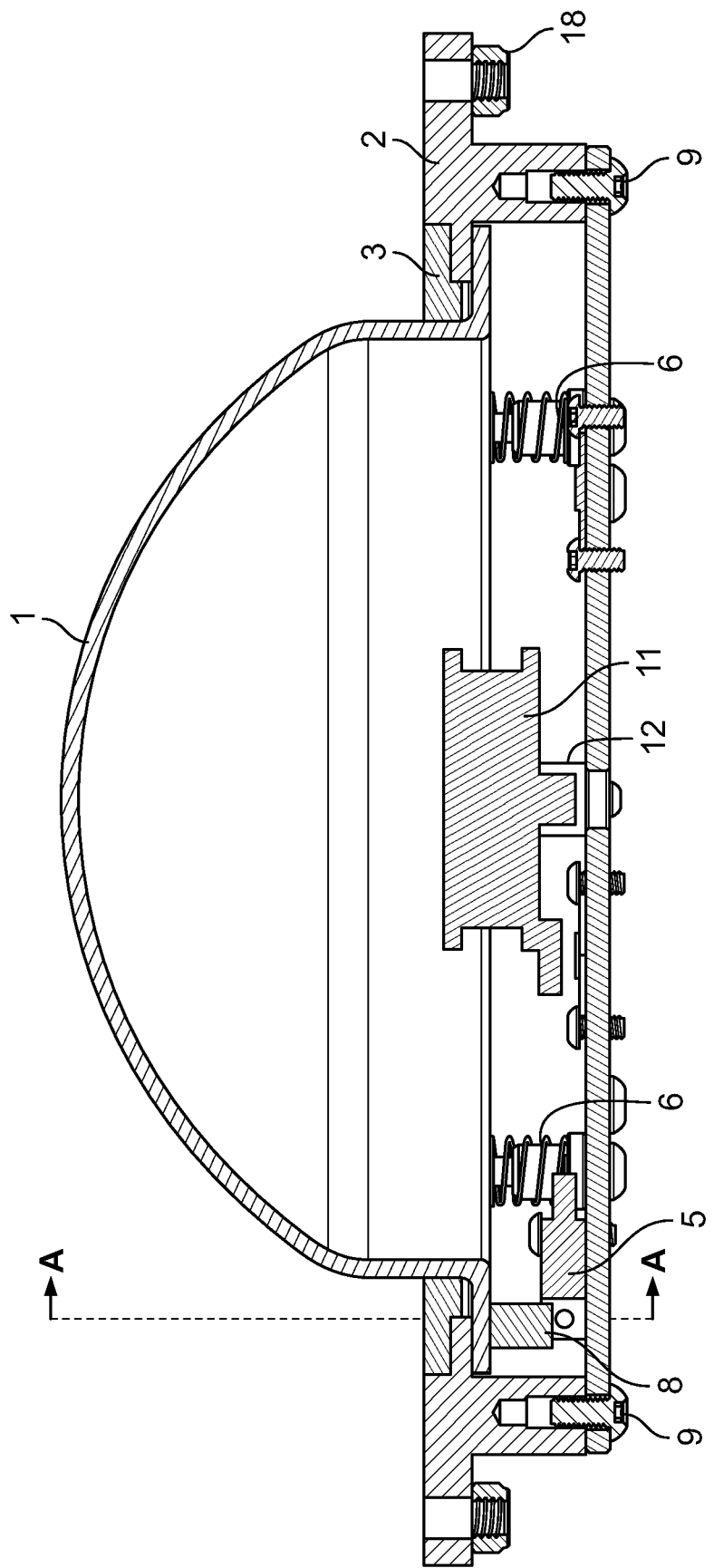
FIG. 3 is a sectional side view of the button assembly of FIG. 2.

In an example, the button housing 2 can have a circumferential groove that houses an O-ring 3. Further, a series of fixation mechanisms 9 (e.g., screws) can be provided to connect the base plate 4 to the button housing 2. For instance, the fixation mechanisms 9 can be screwed into holes in the button housing 2, as shown in FIG. 3.

Note that the button dome 1 is in this example embodiment a CNC urethane component covered with translucent paint. The translucency of the button dome 1 is selected such that it allows for passage of light emitted by the LEDs therethrough sufficiently to achieve readily perceptible backlighting of the button dome 1 even in sunlit conditions. The translucency of the button dome 1, however, is sufficient to hide from view the inner components of the button assembly.

The button assembly further carries the aforementioned user detection sensor in the example form of a motion sensor, in this example comprising a radar proximity sensor supplied 11 by SimplyTronics. The proximity sensor 11 forms part of the assembly such that it is located at least partly within the major cavity defined by the button dome 1. In this respect, refer to FIG. 3, which shows a sectional side view the button assembly. As shown in FIG. 2 and FIG. 3, the base plate 4 of the button assembly can have a central opening, a plurality of openings around the central opening, and a set of dowels 12, which can each have a central bore. A series of fixation mechanisms 13 (e.g., screws) and nuts 10 can be provided to secure the proximity sensor 11 to the base plate 4 through the plurality of holes formed in the base plate 4 and holes formed through the proximity sensor 11. As shown in FIG. 3, the fixation mechanisms 13 can extend through the holes in the base plate 4, through the bore of each dowel 12, through the holes in the proximity sensor 11, and into engagement with the nuts 10.

Note that different types of user detection sensors capable of detection user presence or proximity through the translucent dome may be employed in other embodiments. Thus, for example, operation of the sensor may in some embodiments be based on one or more of capacitive sensing, capacitive displacement sensing, Doppler effect sensing, eddy-current sensing, inductive sensing, magnetic sensing, or any other technique suitable for sensing proximity or presence of a human person through a non-metallic cover member, such as the example polymeric plastic translucent dome.

The proximity sensor 11 is selected and configured so as to sense the presence of a user with an about 1 meter of the sensor 11. It will be seen that the sensor 11 detects user presence and/or movement through the button dome 1. This achieves location of the proximity sensor 11 in an effective sensing position on the vending machine 22, without being visible to the user or otherwise affecting the aesthetic appearance of the vending machine 22.

In this example embodiment, an upper half of the sensor 11 is obscured (e.g., by a metallic cover plate), so that the sensor 11 is configured to sense only a lower half of its range. Worded differently, the sensor 11 is configured and positioned to sense proximity and/or movement of an adult user from below the torso and downwards. This arrangement improves efficacy of the user proximity detector by substantially disregarding most head and arm movements of the user.

Figure 4:
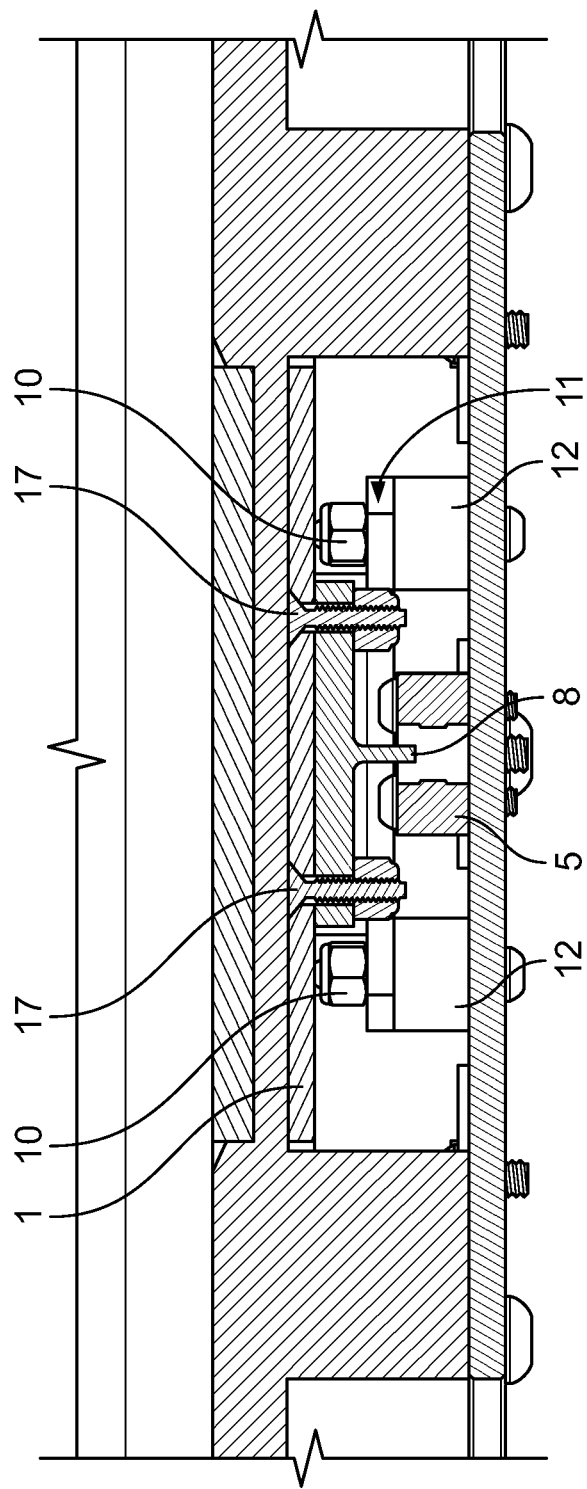
FIG. 4 is a sectional side view of an optical sensor switch forming part of the button assembly of FIG. 2.

Returning now to FIG. 2, it can be seen that the assembly further includes a flag piece 8 attached to the rim of the button dome 1 and positioned for co-operation with slot-type photo interrupter optical sensor 5, such that movement of the button dome 1 caused by user depression thereof is automatically sensed by the optical sensor 5 due to corresponding movement of the flag piece 8. The optical sensor 5 can be coupled to the base plate 4 using fixation mechanisms 17 (e.g., screws) inserted into openings in the optical sensor 5 and into corresponding openings in the base plate 4. The flag piece 8 can be coupled to the rim of the button dome 1 using fixation mechanisms 14 (e.g., screws) and nuts 10. The optical sensor 5 is, in turn, connected in an electronic circuit to register selection of the corresponding button responsive to detection of flag piece 8 movement. FIG. 4 shows a more detailed view of partial reception of the flag piece 8 in the optical sensor 5.

The proximity sensor 11 in the button assembly is in communication with electronic circuitry forming part of the vending machine, which is configured to automatically power up the vending machine user interface responsive to detection of user presence, and to deactivate after conclusion of each user interaction cycle.

At start, the vending machine 22 is thus, by default, in a low-power mode, in which the display screen 19 and the button backlighting is deactivated. When a user walks up to the device and stands before the vending machine 22's front panel, user presence is detected by the proximity sensor 11 incorporated in the central button assembly. This triggers activation of the user display 19, together with lighted display of the respective selection buttons 1.

In this example embodiment, the user interface is configured to allow a user to virtually try on respective Spectacle variants. When a user, for example, selects the red button, a substantially real-time video captured by the vending machine 22 camera is displayed on the display screen 19, augmented by an overlay that displays the selected Spectacles on the user's face. During this process, the selected button 1 is continuously backlit. If the user wishes to acquire the relevant Spectacle variant, the user can repeat-press the relevant button 1 to confirm the transaction.

Instead or in addition to the above-described features relating to user detection via a sensor integrated in a press button, some embodiments of the disclosure comprise a vending machine configured to display a synchronized audio and light display to a user in response to a user input or sensor data (e.g. data from a radar button or other detector that senses a user.) In one such embodiment, the audio and light displays are synchronized by controlling the lights (e.g. light emitting diodes (LEDs)) using an audio signal.

In the example embodiment of FIG. 1, the dispensing mouth 23 has a translucent white door which is openable to access dispensed articles, with an array of colored LEDs being mounted adjacent the mouth door. Variation of LED color and intensity thus causes an animated light display to be visible in the vending machine mouth.

Such systems may be configured with circuitry that takes an analog audio signal and uses bandpass filters to isolate audio present in one or more different frequencies ranges (e.g. bandwidth around or at 60 Hz, 160 Hz, 400 Hz, 1 kHz, 2.5 kHz, 6. Hz, 10 kHz and 16 kHz, etc.) The circuitry processes this information as a control signal. In some embodiments, this control signal information is processed at a controller as a value representing the magnitude of the signal at a particular frequency at any given moment.

In some embodiments, to generate the above control signal within an audio signal, a system generates tones for each of the frequencies used by the system for LED control. These may be created either with sine or triangle curves, or any other such signal. In various embodiments, different such signals may be selected depending on which provides the most isolation between frequency bands.

For each frequency, there is a range of loudness that the circuitry is able to detect while keeping the returned values mostly isolated from the overlapping neighbor frequencies. Such ranges may be determined through repeated testing of the particular circuitry. These ranges are considered and compensated for to normalize the output.

Each of the control signal frequency's numerical outputs are then communicated to LED brightness control circuitry. In some embodiments, one output voltage is used for each light. In other embodiments, groups of lights or LED chains may be controlled by each control signal. In still further embodiments, different combinations of outputs may control the lights in any fashion.

An audio synchronized light show is then generated by controlling the loudness-over-time of each of the control frequencies. If the music on the channel interferes with the control frequencies, the tones from the music may be suppressed or enhanced to prioritize the light control over music at the specific control frequencies. In some embodiments using a multi-channel audio system, the control tones may only be encoded on one audio channel of the resulting file for the multi-channel system. In various embodiments, the channel with the control signal may have music signals, or may have no music signals. In some such embodiments, the channel having the light control signal is mixed at different volume levels to match the range of loudness the circuitry is able to detect as mentioned above. The channels without the control signal are connected to audio output systems (e.g. speakers). By having a control signal on one channel and audio on another channel within a single file, the audio and light control are tightly synchronized and controllable together by a single input signal. Such a system minimizes use of code and processing resources for control of the synchronized audio and light display. Simply by changing the generated control tone volumes in the channel of audio, the light show may be re-mixed simply without modifying the audio and while maintaining simple synchronization.

Additionally, multiple different audio files or different parts of an audio file may be used to generate a different synchronized audio and light display in response to different inputs. Detection of a user approach may thus access a first set of multi-channel audio data used for a first display, user selection at an input may cause the system to access a second set of multi-channel audio data for a second display, and a purchase or detection of a user leaving the area may result in access of a third set of multi-channel audio data used for a third display. Complex patterns of audio and light display experiences may thus be generated in response to different combinations of sensor data and user inputs linked to multi-channel audio files containing light control data.

Example Machine and Hardware Components

Figure 5:
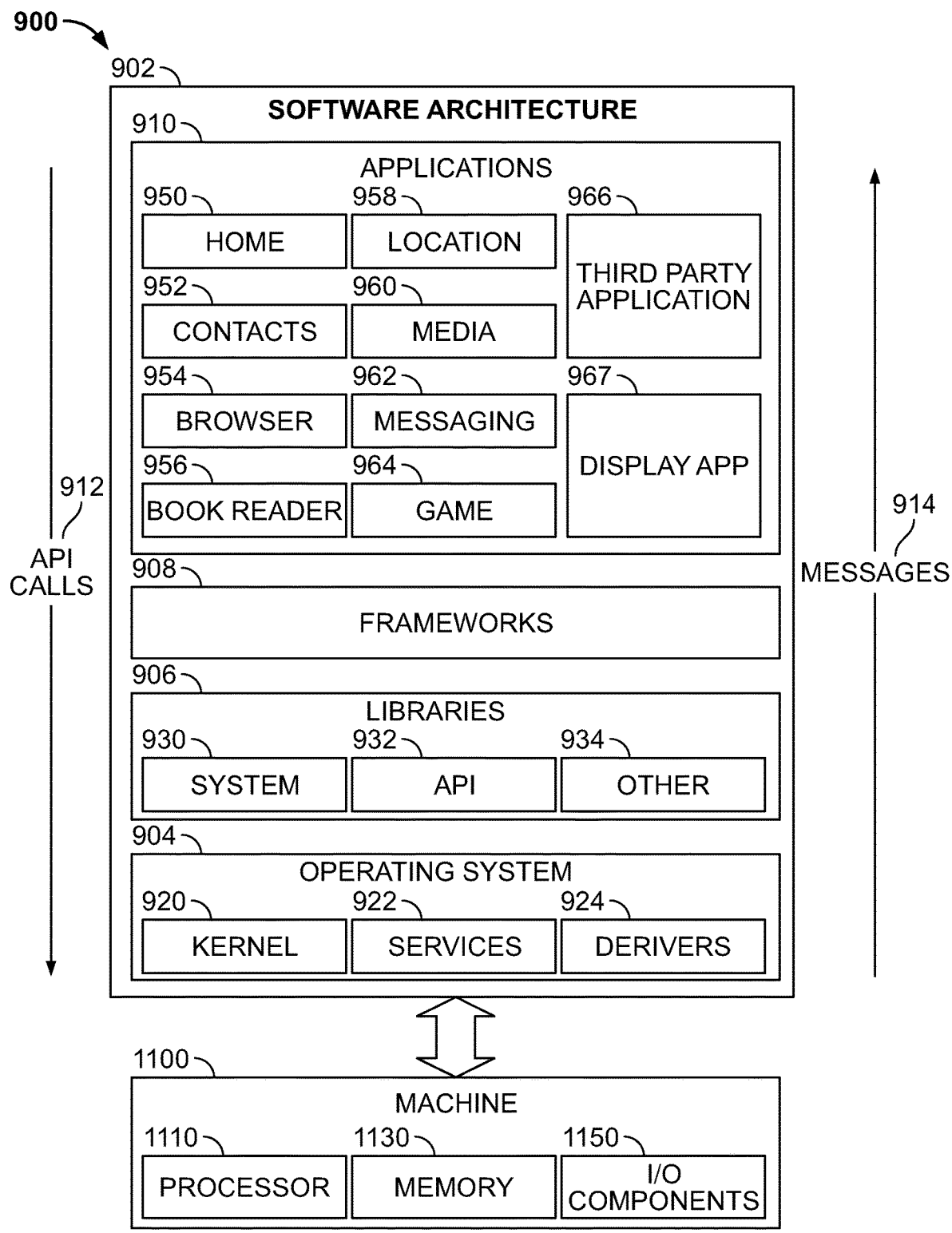
FIG. 5 is a block diagram illustrating an example of a software architecture that may be installed on a machine, according to some example embodiments.

FIG. 5 is a block diagram 900 illustrating an architecture of software 902, which can be installed on any one or more of the devices described above. FIG. 5 is merely a non-limiting example of a software architecture, and it will be appreciated that many other architectures can be implemented to facilitate the functionality described herein. In various embodiments, the software 902 is implemented by hardware such as machine 1100 of FIG. 6 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device, server computer of a server system, or any other device described herein may operate using elements of software 902. Devices such as the computer systems and display mechanisms, as described earlier, may additionally be implemented using aspects of software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers. BLUETOOTH® or BLUETOOTH® Low Energy drivers, flash memory drivers, serial communication drivers (e.g., Universal Serial Bus (USB) drivers). WI-FI® drivers, audio drivers, power management drivers, and so forth. In certain implementations of a device such as the display mechanism 104 of smart glasses 100, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4). Advanced Video Coding (H.264 or AVC). Moving Picture Experts Group Layer-3 (MP3). Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a display application 967. Such an application 967 may interact with I/O components 1150 to establish various wireless connections with devices such as the display mechanisms described above. Display application 967 may communicate with the display mechanisms described above to automatically control display of computer-generated information via the display mechanisms.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment. The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 6:
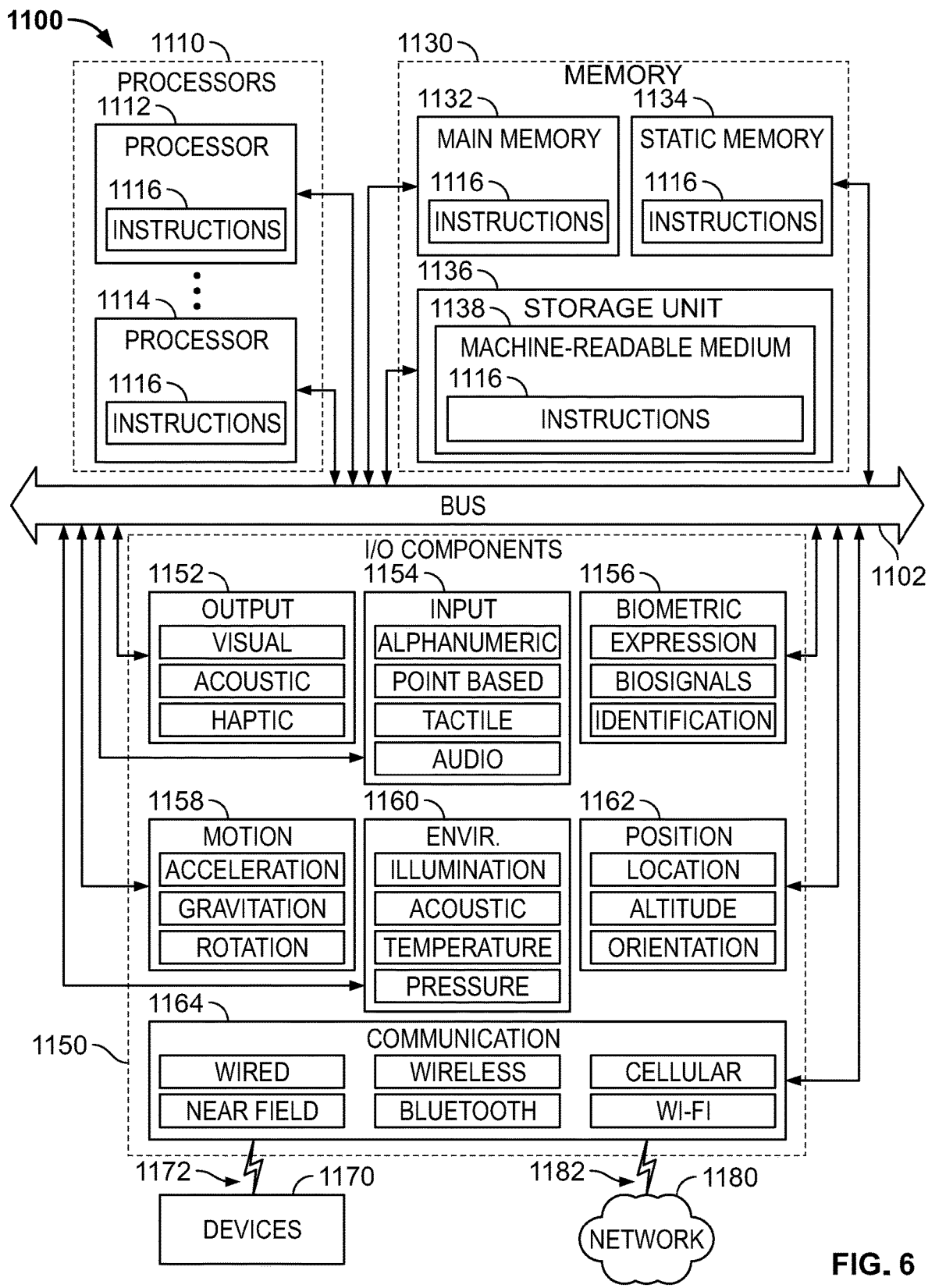
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 1100, according to some embodiments, able to read instructions from a machine-readable medium (e.g., a machine-readable storage medium) and perform any one or more of the methodologies discussed herein. Specifically, FIG. 6 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network muter, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 6 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 5. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components. Near Field Communication (NFC) components. BLUETOOTH® components (e.g., BLUETOOTH® Low Energy). WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components. NFC smart tag detection components, optical reader components (e.g., an optical sensor to detect a one-dimensional bar codes such as a Universal Product Code (UPC) bar code, multi-dimensional bar codes such as a Quick Response (QR) code. Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology. General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA). Worldwide Interoperability for Microwave Access (WiMAX). Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

What is claimed is:

1. A vending machine comprising:
a vending-machine housing having a cavity configured to store one or more items;
a button assembly incorporated into the vending-machine housing, the button assembly comprising:
a base;
a button component resiliently coupled to the base, such that the button component is depressible relative to the base, the button component defining a cavity; and
a first sensor configured to sense proximity of a human user to the vending machine, the first sensor being disposed in the cavity of the button component;
a camera integrated into the vending-machine housing;
a display integrated into the vending-machine housing; and
a computing device configured to perform automated operations comprising:
registering a user selection indicating a selected item stored inside the vending machine;
via the camera, capturing a first image of the user; and
via the display, displaying an augmented image of the user based on the first image, the augmented image depicting the user utilizing the selected item.

2. The vending machine of claim 1, wherein the one or more items comprise wearable items, the computing device being configured to display the augmented image as depicting the user wearing the selected item.

3. The vending machine of claim 1, wherein the button component is composed of a translucent material that has a translucency sufficient to hide the first sensor from view, but allow light to pass through the button component.

4. The vending machine of claim 1, wherein the first sensor is configured to detect proximity and/or motion of a human user relative to the vending-machine housing through the button component.

5. The vending machine of claim 1, further comprising a second sensor, the second sensor being configured to detect depression of the button component relative to the base.

6. The vending machine of claim 5, wherein the second sensor is an optical sensor.

7. A method of operating a vending machine comprising:
providing a vending machine comprising a computing device, a display, and a button assembly, the button assembly including a button component;
detecting proximity of a user relative to a housing of the vending machine using a first sensor incorporated in the button assembly; and
by way of the computing device, causing the display of the vending machine to enter a user-interaction cycle when the sensor detects that a user is within a certain predefined proximity to the vending machine, the user-interaction cycle comprising:
registering a user selection indicating a selected item stored inside the vending machine;
capturing, using a camera associated with the vending machine, a first image of the user; and
displaying, by way of the display, an augmented image of the user based on the first image, the augmented image depicting the user utilizing the selected item.

8. The method of claim 7, wherein the item is a wearable item, first image depicting the user wearing the selected item.

9. The method of claim 7, wherein the button assembly comprises a base, the button component being resiliently coupled to the base, such that the button component is depressible relative to the base, the button component defining a cavity that houses the first sensor.

10. The method of claim 9, further comprising depressing the button component to select an item stored in the vending machine.

* * * * *